Dec. 24, 1963     O. R. NEMETH     3,115,573

COUNTER

Filed April 5, 1960     2 Sheets-Sheet 1

INVENTOR.
OTTO R. NEMETH
BY *Elliott & Pastoriza*
ATTORNEYS

Dec. 24, 1963     O. R. NEMETH     3,115,573
COUNTER

Filed April 5, 1960     2 Sheets-Sheet 2

INVENTOR.
OTTO R. NEMETH
BY *Elliott & Pastoriza*
ATTORNEYS

United States Patent Office 3,115,573
Patented Dec. 24, 1963

3,115,573
COUNTER
Otto R. Nemeth, Santa Monica, Calif., assignor to Durant Manufacturing Company, Milwaukee, Wis., a corporation of Wisconsin
Filed Apr. 5, 1960, Ser. No. 20,164
11 Claims. (Cl. 235—92)

This invention relates generally to counters and more particularly to an improved electro-mechanical type counter for adding and subtracting electrical input pulses.

Counters are well known in the art and generally constitute the essence of any computing machine. While electro-mechanical type counters responsive to both "add" pulses and "subtract" pulses are known, their effectiveness in providing an accurate count depends to a large extent on the care taken in manufacturing and assembling the various components making up the counter. Thus, in important applications, the basic counter units themselves can become expensive and thus increase the overall cost of a general purpose computer. Moreover, electro-mechanical type counters heretofore have been limited in counting speed.

With the above in mind, it is a primary object of the present invention to provide an improved miniature high speed pulse counter of the electro-mechanical type which is extremely economical to manufacture and yet provides a reliable count as well as many additional features not found in units presently available.

More particularly, it is an object to provide an improved counter responsive to both "add" input pulses and "subtract" input pulses.

Another object is to provide a counter of unique design for displaying visually any one of the ten digits 1, 2, 3, 4, 5, 6, 7, 8, 9, and 0 and so arranged that a plurality of such counters all identical in construction, may be provided and connected together so that a final number displayed by all of the counters together may include a number of digits equal to the number of counters. There is thus no limitation on the size of the number that can be counted.

Another important object is to provide a counter which may be reset from any number to a zero indication extremely rapidly regardless of the size of the number displayed.

Briefly, these as well as other objects and advantages of the invention are attained by providing a basic counter including a counter wheel, input add and subtract pulse terminals, and output add and subtract pulse terminals. The counter includes first and second means for rotating the wheel in discrete forward and backward steps respectively through angles of 36 degrees in response to reception of pulses at the add and subtract input terminals. The wheel is thus capable of ten different discrete positions angularly separated by 36 degrees in effecting one complete rotation and these positions respectively successively correspond in a forward step direction to the digits 1, 2, 3, 4, 5, 6, 7, 8, 9, and 0.

The counter additionally includes add and subtract pulse means for providing single add and subtract pulses at the add and subtract output terminals only when the wheel is respectively stepped forwardly from a position corresponding to the digit 9 to a position corresponding to the digit 0, or stepped backwardly from the position corresponding to the digit 0 to the position corresponding to the digit 9. By this arrangement, a plurality of additional counters identical to the basic counter may be connected in series so that their respective input add and subtract pulse terminals will connect to the output add and subtract pulse terminals of the immediately preceeding counter. The additional counters thus serve to indicate digits corresponding to tens, hundreds, thousands, etc.

Incorporated in the counter wheel itself together with the means for actuating the wheel are novel circuits for insuring complete stepping of the wheel, in the basic unit as well as in the additional units, independently of the pulse width of the pulses received by the counters. These circuits in conjunction with a novel reset circuit further enables simultaneous resetting of all of the counters to 0 so that the counter system can be reset to zero in the same time that it would take to reset any one of the counters alone.

A better understanding of the foregoing features of the invention will be had by referring to a preferred embodiment thereof as illustrated in the accompanying drawings, in which.

Figure 1:
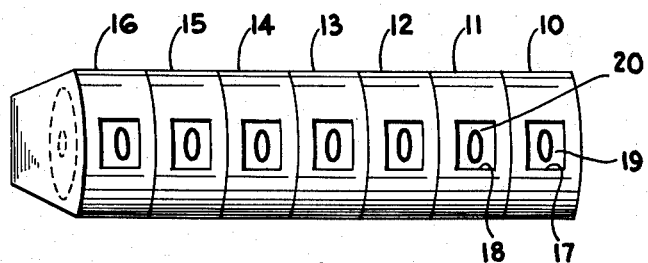
FIGURE 1 is a schematic perspective view illustrating a plurality of the counters of the present invention connected together to display any number from one to seven digits.

Referring first to FIGURE 1, there is shown a plurality of individual counters 10, 11, 12, 13, 14, 15, and 16. Each of these counters in the embodiment chosen for illustrative purposes includes a display window such as indicated at 17 and 18 for the first two counters 10 and 11. Within each of the counters there are provided counter wheels as at 19 and 20 for the counters 10 and 11, each wheel including the digits 1, 2, 3, 4, 5, 6, 7, 8, 9, and 0 evenly spaced about their peripheral edges so that they can individually appear in the windows depending upon the rotational position of the wheels.

In accordance with an important feature of this invention, each of the counters 10 through 16 are identical in construction so that the final number desired to be displayed may include a number of digits equal to the number of the individual counters employed. In FIGURE 1 for example, a seven-digit number can be displayed thus providing a counter capable of totalling from 1 to 9,999,999 pulses.

Since all of the counters are identical, the description of the first counter 10 together with its connections to the next successive counter 11 will suffice for an understanding of the operation of any number of counters arranged as shown in FIGURE 1.

Figure 2:
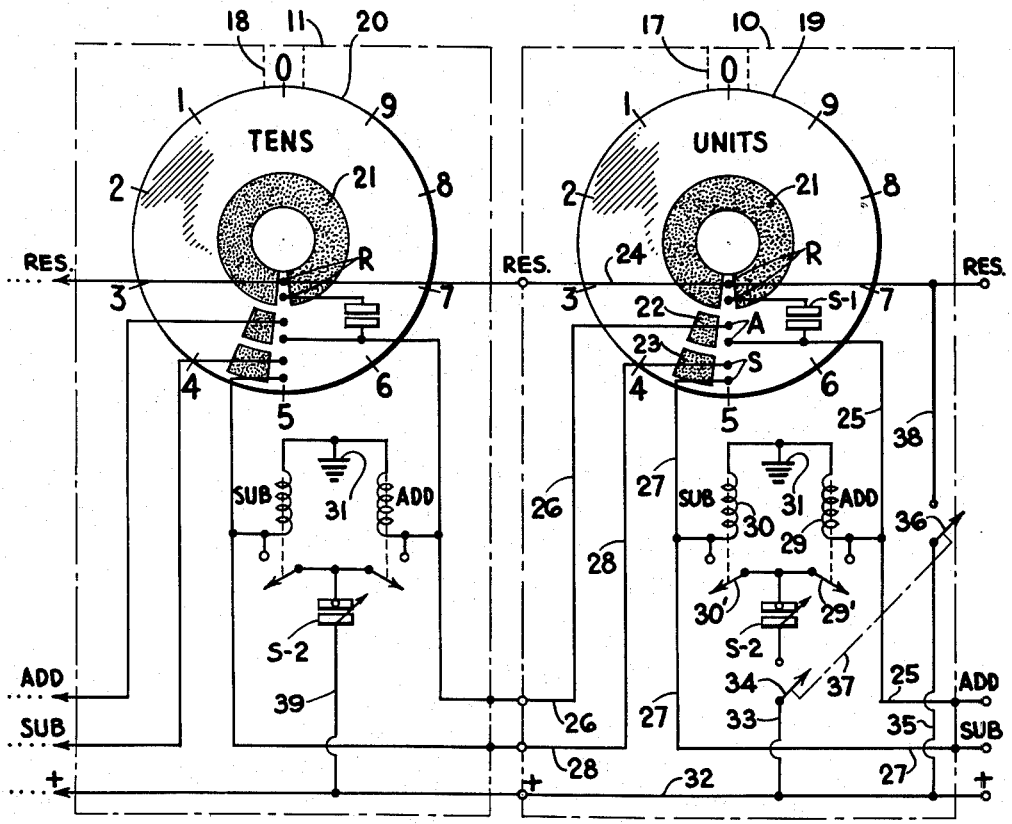
FIGURE 2 is a schematic electrical circuit diagram of the essential components incorporated within two of the counters of FIGURE 1.

Thus, referring to FIGURE 2, there are shown schematic electrical circuit diagrams of the counters 10 and 11 of FIGURE 1. These counters will display together the units and tens digits of any number from 0 to 99. The display of the tens digits is merely a consequence of the positioning of the counter 11 immediately to the left of the units digit counter 10 so that the display afforded by the windows 18 and 17 taken together provide the proper digital positional notation for tens and units respectively. Any of the counters 10, 11, 12, 13, 14, 15, and 16 could be interchanged in any manner desired without any necessary changes in the internal circuitry of the individual counters provided they are successively connected in series in correspondence with their physical position.

With particular reference now to the units counter 10, it will be noted that the wheel 19 is provided with the various digits 1–9 and 0 uniformly spaced above the periphery of the wheel itself as schematically indicated. This wheel 19 is mounted for rotation through discrete steps of 36 degrees each so that ten discrete different positions of the wheel will result in a display of the ten digits respectively in the window 17 when the wheel is stepped in a forward direction.

In addition to the digits, the wheel 19 includes on its front surface a conducting printed circuit portion 21 extending circumferentially about the surface for a distance greater than 324 degrees but less than 360 degrees to leave a small non-conducting arcuate portion. A pair of reset contacts R are stationarily positioned relative to the wheel 19 such as to be electrically bridged by the circumferentially extending conducting portion 21 when the wheel is in a position corresponding to any one of the digits 1 through 9, and to be electrically insulated from each other when the wheel is in a position corresponding to the digit zero.

Also included on the wheel are small printed circuit conducting portions 22 and 23 each of an arcuate extent less than 36 degrees and each arranged to bridge a pair of add pulse contacts A and a pair of subtract pulse contacts S only when the wheel 19 is moving between the position corresponding to the 0 digit and 9 digit. When the wheel is actually in the discrete position corresponding to the 0 digit or corresponding to the 9 digit or to any of the other digits, the contacts A and the contacts S are disconnected. Thus, it is to be understood that electrical bridging of the contacts can only occur when the wheel is moving between the discrete positions corresponding to 0 and 9.

As shown, one of the pair of contacts R connects to a common lead 24 passing through reset terminal RES. to a corresponding R contact on the next adjacent counter wheel 20. The other R contact in counter 10 connects through a normally closed recycling switch S–1 to an input add pulse terminal lead 25.

The pair of add pulse contacts A in turn respectively connect between the input add pulse terminal lead 25 and an output add pulse terminal lead 26. This output add pulse terminal lead 26, as shown, connects to an output add pulse terminal in turn connected to the input add pulse terminal of the next adjacent counter 11. Similarly, the substract pulse contacts S connect respectively between an input subtract pulse terminal lead 27 and an output subtract pulse terminal lead 28. The output subtract pulse terminal lead 28 connects to the input subtract pulse terminal for the next adjacent counter 11 which terminal, as in the case of the add input terminal, is physically positioned on the counter to correspond to the positioning of the input subtract pulse and input add pulse terminals for the counter 10.

Physical rotation of the wheel 19 in discrete steps in a forward or backward direction is accomplished by first and second electromagnet means represented schematically in part in FIGURE 2 by first and second add and subtract coils 29 and 30 in the center portion of the diagram for the counter 10. The ends of these coils are connected together and grounded as at 31. The other ends of the coils connect respectively to the input add pulse terminal lead 25 and input subtract pulse terminal lead 27. With this arrangement, reception of an electrical add pulse at the input add pulse terminal lead 25 will energize the first coil 29, and reception of a subtract pulse on the input subtract pulse terminal lead 27 will energize the coil 30.

In addition to the foregoing, each of the various counters includes self energizing switches as indicated at 29' and 30' arranged to close upon energization of the coils 29 and 30 respectively as shown for the counter 10. An independent source of electrical energy provided on a common line 32 shown at the bottom of FIGURE 2 is arranged to be connected through a branch lead 33, shut off switch 34, and a normally closed de-energizing switch S–2 to the self-energizing switch means 29' and 30'. This provision of the independent electrical energy source on the line 32 is provided to insure positive action of the stepping means as will be described in detail subsequently. In addition, this power is also employed for re-cycling of the various counters. Towards this latter end, the first counter 10 also includes a lead 35 extending from the electrical energy source lead 32 through a reset switch 36, ganged to the shut off switch 34 as indicated at 37. The reset switch 36, when closed, connects power from the line 32 through a lead 38 to the common conductor 24 of the upper reset contact R associated with the printed conducting portion 21 of the wheel 19.

The shut-off switch 34 and reset switch 36 are preferably externally attached to the unit 10 and constitute the only difference of the unit 10 from the additional counters such as 11, 12, 13, 14, 15, and 16. Thus, in FIGURE 2, the counter 11 has its self-energizing switch means directly supplied from the electrical energy source line 32 through a lead 39 passing through the de-energizing switch S–2. The reason for the foregoing switch connections associated only with the first or unit counter 10 will become clearer as the description proceeds.

With the understanding that the wheel 19 will be stepped through a discrete arc of 36 degrees in a forward or clockwise direction each time the add coil 29 is energized in response to reception of an input add pulse at the input add pulse terminal lead 25, and will be stepped in a backward or counter-clockwise direction through an arc of 36 degrees each time the subtract coil 30 is energized upon reception of an input subtract pulse on the input subtract pulse terminal line 27, the operation of the electrical portion of the counter as described above in FIGURE 2 will now be set forth.

Assume first that an add electrical pulse is received at the input add terminal lead 25 in the lower right hand portion of FIGURE 2. This pulse will pass through the lead 25 and add coil 29 to ground at 31 thereby energizing the add coil. Energization of this coil will in turn actuate a first actuating means to step the wheel 19 in a clockwise direction through an arc of 36 degrees so that digit 1 will appear in the window 17. Cessation of the pulse will de-energize the coil 29 and permit the actuating means to return to its normal position. The next input add pulse received at the input add terminal lead 25 will again energize the coil 29 to again step the wheel 19 through another arc of 36 degrees so that the digit 2 will appear in the window 17.

If an input subtract pulse is received on the input subtract terminal lead 27, this pulse will pass through the lead 27 and subtract coil 30 to ground at 31 thereby energizing a second actuating means for stepping the wheel 19 in a counter-clockwise direction thus causing a digit to appear in the window 17 of numerical value one less than the previous digit. If another subtract pulse is received, the process will be repeated to step the wheel 19 again in a counter-clockwise direction thus again subtracting from the count.

Assume now that nine input add pulses have been received so that the digit 9 appears in the window 17. On reception of the next input add pulse causing energization of the coil 29, the wheel 19 will move from the position corresponding to the digit 9 in a clockwise direction to the position corresponding to the digit 0. In executing this movement, however, the printed conducting portion 22 on the wheel will bridge the contacts A so that the pulse on the line 25 will be transferred to the line 26 and thus to the output add pulse terminal. This pulse will then pass to the next counter 11 and energize its add coil to cause the wheel 20 to step in a clockwise direction through 36 degrees so that the digit 1 appears in the window 18. In the meantime, the digit 0 will appear in the window 17 and the printed conductive portion 22 will have passed under the contacts A and thus leave them in open condition. The numerals 1 and 0 will then appear in the windows 18 and 17 respectively thus indicating the number 10.

With additional add pulses provided to the counter 10, the wheel 19 will cycle through the various digits, but since the contacts A on the wheel 19 will not be bridged by the conducting portion 22 until the wheel 19 again moves in a direction from 9 to 0, the digit 1 appearing in the window 18 of counter 11 will remain.

In the case where the counters register the number 10 and a subtract pulse is received, the subtract coil 30 will be energized thus stepping the wheel 19 in a counter-clockwise direction from the 0 digit to the 9 digit. In this case, the conducting printed portion 23 will bridge the subtract terminals S and the subtract pulse will thus be passed to the output subtract pulse terminal lead 28 to the counter 11 to energize the subtract coil thereof and rotate the wheel 20 from its former position in which the digit 1 was displayed to the position in which 0 is displayed. The total count exhibited by the two counters 10 and 11 will then be 9.

From the foregoing description it will be evident that the additional counters 12, 13, 14, 15, and so on can be operated in a like manner so that any desired number constituted of any number of digits can be displayed. Further, the addition and subtraction of pulses is automatically registered on the counters as a consequence of the conducting portions 22 and 23 and co-operating contacts A and S.

It is preferable to insure positive action of the counter wheel by insuring a relatively constant electrical energy supply to the actuating coil. For example, the add and subtract pulses supplied to subsequent counters from a bridging of the corresponding contacts in the previous counters by the printed conducting portions 22 and 23 may not have sufficient length to insure positive actuation of the add and subtract coils in the subsequent counters. It is to solve this problem, as mentioned heretofore, that the self-energizing switch means constituting the switch arms 29' and 30' co-operating with the coils 29 and 30 are provided. As a general rule, the supplied input add and subtract pulses themselves are of sufficient length to operate the coils 29 and 30 and thus the self energizing switch means 29' and 30' in the first counter 10 need not be employed for this reason. In fact, these switches are out of the circuit when the shut-off switch 34 is in open position. With respect to the subsequent counters, however, thte only pulse length provided to energize the same, as described, is that resulting from the bridging printed conducted portions on the wheel, and for these counters, the independent electrical source of energy on the line 32 is passed directly through the normally closed switch S-2 to the self energizing switch means.

For example, with reference to the counter 11 in FIGURE 2, assume that an add pulse is received on its input add pulse terminal so that its add coil is energized. The initial energization of the add coil will close its associated self-energizing switch arm thereby providing current for the coil directly from thte line 32 through the lead 39, switch S-2, and the corresponding switch arm. The normally closed switch S-2 is arranged to be mechanically actuated by the mechanism which effects stepping of the wheel 20 to open only at the terminal portion of the wheel movement. Therefore, when the stepping of the wheel 20 is substantially completed, the switch S-2 is opened thereby de-energizing the add coil and releasing the stepping actuating means so that it may return to a position ready for reception for the next pulse. The same self energizing feature obtains in the case of the subtract coil.

With respect to the unit 10 in FIGURE 2, if the shut off switch 34 is closed and the reset switch 36 held open, the coils 29 and 30 will be self-energized by electrical energy from the line 32 and de-energized by the switch S-2 at the completion of wheel movement as described with respect to the counter 11.

In order to re-set the various units to 0, the re-set switch 36, which is ganged to the switch 34 as described heretofore, is closed. When the switch 36 is closed, power from the line 32 will pass directly through the lead 35 and lead 38 to the common lead 24 connecting to the upper of the R contacts associated with the conducting portions 21 on each of the wheels. If the wheel of any one counter is not in the 0 digit position, the R contacts will be electrically bridged by the conducting portion 21 thereby applying energy through the re-cycling switch S-1 to the input add pulse terminal lead 25. This energy will then pass through the lead 25 and add coil 29 to ground at 31 thereby effecting a stepping of the wheel in a clockwise direction. The re-cycling switch S-1 is arranged to be mechanically opened just after the beginning of the wheel movement. Thus, the energy from the line 32 is removed from the coil 29. However, prior to opening of the switch S-1, the coil 29 has been energized sufficiently to close the self-energizing switch means 29' and thus power to the coil 29 is provided directly through the lead 33, the switch 34, which is now shut since it is ganged to the re-cycling switch 36, and the switch S-2.

When the movement of the wheel 19 is substantially complete, the de-energizing switch S-2 will open thus de-energizing the coil 29. When the actuating means for stepping the wheel 19 returns to its normal position, it will then effect the closure of the switch S-1 thereby again supplying energy from the line 32 through the contacts R to the add coil 29. The cycle will thus be repeated until the wheel 19 is stepped around to a position in which the 0 digit is displayed. In this position, the bridging printed conducting circuit 21 will no longer connect the contacts R and thus no further stepping will take place.

An identical cycling operation occurs in the counter 11 and the remaining counters whenever the reset switch 36 is closed so that all of the counters can be stepped simultaneously to their 0 digit positions.

Figure 3:
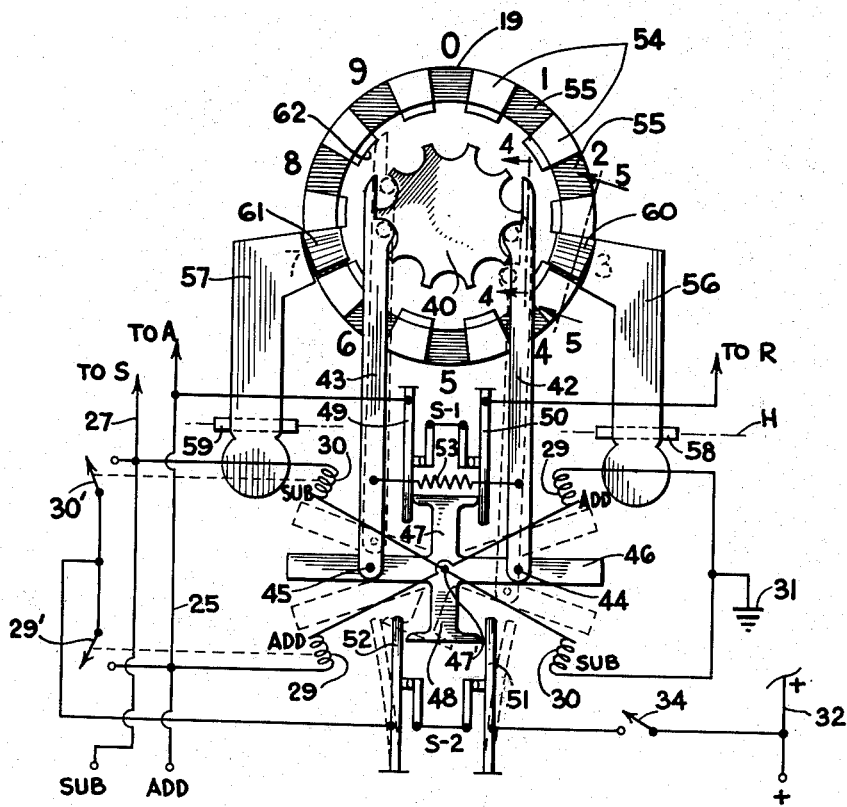
FIGURE 3 is another schematic diagram of the back side of one of the counters of FIGURE 2 illustrating certain mechanical features of the invention.

The first and second actuating means responsive to energization of the coils 29 and 30 in the first unit as well as in all of the subsequent units for actually stepping the corresponding wheels will be better understood by now referring to FIGURE 3 which schematically depicts some of the elements already described in FIGURE 2 as viewed from the back side.

In FIGURE 3, the counter wheel 19 is shown as including on its back portion a ratchet wheel 40 provided with ratcheting indents 41 co-operating with first and second pawl arms 42 and 43. As shown, these pawl arms are respectively pivoted at 44 and 45 to an armature 46. Armature 46 in turn is pivoted for rocking movement about an axis passing through its center point 47' normal to the plane of drawing. The add and subtract coils 29 and 30 described in connection with FIGURE 2 constitute split windings positioned as shown so that upon energization the armature will be rocked in one direction or the other.

The armature 46 includes laterally extending T-shaped member 47 and 48 arranged to actuate the switches S-1 and S-2 described in connection with FIGURE 2. The switch S-1, for example, includes flexible contacting arms 49 and 50. Similarly, the switch S-2 includes flexible contact arms 51 and 52. The contact arms 49 and 50 engage respectively opposite ends of the T member 47 so that upon any initial rocking movement of the armature 46 towards the dotted line positions depicted will immediately result in opening of one or the other of the contacts associated with the contact arms 49 and 50. Since these contact arms are connected in series, the switch S-1 will always open at the initial part of the movement of the armature 46 regardless of the direction of movement.

With respect to the switch S-2, however, the flexible arms 51 and 52 are spaced out of engagement with the corresponding T-shaped member 48. These arms will thus not be engaged until the terminal portion of the rocking movement of the armature 46 so that switch S-2 will only be opened at the end portion of this movement. Again, the contact arms 51 and 52 are connected in series so that actuation of either one will effectively open the switch.

The connection of the arms 49 and 50 and 51 and 52 to the other portions of the circuit described in FIGURE 2 are shown. Thus, the flexible arm 49 for the switch S-1 connects to the input add pulse terminal lead 25 at the left and the other side of the switch connects to one of the R contacts as described in FIGURE 2. Similarly, the flexible arm 51 for the switch S-2 connects to the switch 34 and lead 33 to the electrical energy source line 32, and the flexible contact arm 52 connects to the self-energizing switch means 29' and 30'.

Also included in the structure is a biasing spring 53 connected between the first and second pawl arms 42 and 43 to bias their upper ends into engagement with the ratchet wheel 40. The armature itself is normally biased to a neutral or center position shown in solid lines by the resilient nature of the contact arms 49 and 50 of the switch S-1. Other center biasing means could be employed.

In addition to the foregoing structure, the counter also includes indexing means for accurately positioning the wheel in its discretely stepped positions. In FIGURE 3, this indexing means comprises a plurality of raised portions 54 about the back side periphery of the wheel 19 defining therebetween indented or indexing channels 55. Co-operating indexing arms 56 and 57 are pivoted for rocking movement at one end about pivots 58 and 59 respectively. The other ends of the arms respectively terminate in angulated indexing tabs 60 and 61 receivable within the indents 55 of the wheel when the wheel is in one of its stepped positions. Either indexing arm 56 or 57 is arranged to be raised out of the plane of the paper by rocking movement about its corresponding pivot point when either the adjacent add or subtract coil 29 or 30 is energized.

Figure 4:
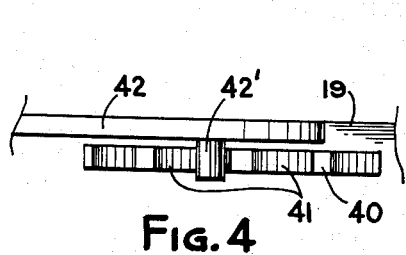
FIGURE 4 is a fragmentary elevational view of a portion of the counter of FIGURE 3 taken in the direction of the arrows 4—4; and, FIGURE 5 is a fragmentary view partly in cross section taken generally in the direction of the arrows 5—5 of FIGURE 3.

FIGURE 4 shows in clear detail the manner in which the first pawl arm 42 is arranged to engage the ratchet indents 41 of the ratchet wheel 40. As shown, there is a small cylindrical projection 42' which is actually received in the ratchet indent so that the main portion of the pawl arm 42 rides over the top of the ratchet wheel. Thus with up and down motion of the pawl 42 as viewed in FIGURE 3, the wheel 19 will be stepped in a counter-clockwise direction, whereas for up and down motion of the pawl 43 the counter wheel 19 will be stepped in a clockwise direction. However, when the wheel 19 is viewed from the front as in FIGURE 2, movement of the pawl 41 will effect a clockwise or forward step rotation and movement of the pawl 43 will effect a counter-clockwise or backward step rotation.

Figure 5:
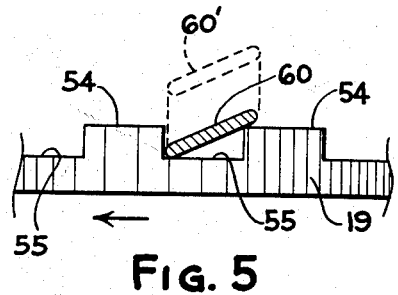

In FIGURE 5, the manner in which the angulated indexing tabs such as the tab 60 for the index arm 56 is received within the indexing channel 55 is shown. It will be evident that when the tab 60 is received within a channel, movement of the wheel 19 as viewed in FIGURE 3 in a counter-clockwise direction is blocked. However, movement of the wheel in a clockwise direction or in the direction of the arrow shown in FIGURE 5 will not be blocked by the indexing arm 56, the angulated tab 60 simply riding up over the projections 54.

The angulated tab 61 for the indexing arm 57 functions in a similar manner.

The operation of the above-described structure will now be set forth. As will be recalled from the operation of the electrical portion of the circuit shown in FIGURE 2, when an input add pulse is received on the input add pulse line 25, the add coil 29 is energized. In FIGURE 3, energization of the split add coil 29 as shown will thus rotate the armature 26 in a counter-clockwise direction towards the dotted line position. Simultaneously the indexing arm 56 will be lifted by the coil 29 to free the wheel 19 for movement. Movement of the armature 46 in a counter-clockwise direction will raise the first pawl 42 and retract the second pawl 43. Raising of the first pawl 42 will cause its corresponding cylindrical projection portion 42' shown in FIGURE 4 to move the ratchet wheel 40 and thus the counter wheel 19 in a counter-clockwise direction through an arc of 36 degrees. The indexing arm 57 will ride over the projections 54 as described in connection with FIGURE 5. The retraction or downward movement of the second pawl arm 43 will result in its cylindrical projection simply following the downward movement of the indents 41.

When the add input pulse terminates, the coils 29 will be de-energized permitting the indexing arm 56 to fall into the next indexed channel on the wheel 19 and the armature 46 to return to its neutral position.

A similar operation takes place when a subtract pulse is received on the subtract coil 30, the armature 46 then rotating in a clockwise direction to actuate the second pawl 43 and retract the first pawl 42. When the subtract coil is energized, the indexing arm 57 will be raised from its indexing channel permitting rotation of the wheel 19 in a clockwise direction.

When the switch 34 shown in the lower portion of FIGURE 3 is closed or if the line 33 is simply a straight through line connection as characterizes all of the subsequent counters in the system, it will be apparent that upon initial energization of the add coils, for example, the self-energizing switch means 29' will be closed. As described heretofore this closing completes a circuit from the power line 32 shown in the lower right hand portion of FIGURE 3 through the lead 33 and closed switch 34, normally closed switch S-2, self-energizing switch means 29', and coils 29 to ground at 31 thereby maintaining coils 29 energized until the armature 46 has been rotated to its extreme position. As the armature 46 approaches its extreme position, the lower T member 48 will engage the flexible contact arm 51 to open the switch S-2 thereby de-energizing the coils 29. Thus the operation of the switch S-2 as described in connection with the electrical circuit of FIGURE 2 is achieved at the end of the stepping of the wheel as desired. As also described for the re-setting operation the switch S-1 is initially opened by the action of the T member 47.

In addition to the operation of the indexing arms 56 and 57 for insuring proper positioning of the counter wheel 19, a co-operating indexing feature may be incorporated in the structure. This feature resides in the provision of an annular shoulder or lip portion on the wheel 19 inside the projections and channels as indicated at 62. The length of the first and second pawl arms 42 and 43 is made such that when either pawl arm is in its extreme upward position, its end will engage the shoulder 62 and thus check further movement of the arm. This feature in itself thus insures reasonably accurate indexing of the wheel 19. The provision of the indexing arms 56 and 57 however will insure a positive holding of the wheel in its set position when the pawl arms are in their neutral or centered positions shown in solid lines.

From the foregoing description, it will be evident that the present invention has provided a greatly improved counter. Not only can miniaturization be achieved as a consequence of the use of printed circuits on the counter wheel itself for effecting the described add and subtract pulse transfer to subsequent counters but this feature additionally results in a high degree of reliability. Moreover, from the description of the recycling mechanism and reset switches associated with the first counter 10 it will be evident that the desired feature of being able to reset all of the counters to 0 at the same time it takes to set any one of the counters to 0 is realized. In addition, the self-energizing switch means coupled with the independent source of electrical energy will enable the recycling to take place and also insure reliable operation of the various counters independently of the particular size and length of the initial input pulses.

It will be evident that when the counters are connected in series together as described in connection with FIGURES 1 and 2, the particular counters displaying the higher positional digits such as the hundreds, thousands and ten thousands will not be used as much as the units and tens digit counters. In fact, each subsequent counter will only be used one-tenth of the time of the preceeding counter. Thus in order to prolong the life of the counters, the end counters may be interchanged with the initial counters and since each of the counters are identically constructed, this interchange can be readily achieved. Thus uniform wear on all of the counters over prolonged use by this interchanging operation will lengthen the overall life of the entire system.

It should be readily understood by those skilled in the art that while a visual display of the digits has been described in connection with the preferred embodiment, the various outputs of the respective counters could constitute individual signals associated with discrete positions of the counter wheel to provide electrical indications of the digits to the end that other pulse responsive units could be actuated by the counters.

Many other uses and adaptations for the counter of this invention will readily occur to those skilled in the art. The counter per se is therefore not to be thought of as limited to the particular examples chosen for illustrative purposes or to the particular manner of construction given merely as exemplary of one embodiment.

What is claimed is:

1. A counter for adding input add pulses and substracting input subtract pulses to indicate at any instant a number equal to the total number of add pulses received less the total number of subtract pulses received, including, in combination a plurality of counter units each having: an input add pulse terminal; an input subtract pulse terminal; a wheel; first means for rotating said wheel in discrete forward steps of 36 degrees in response to reception at said input add pulse terminal of each of said add pulses respectively; second means for rotating said wheel in discrete backward steps of 36 degrees in response to reception at said input subtract pulse terminal of each of said subtract pulses respectively, whereby said wheel is capable of ten different discrete positions angularly separated by 36 degrees in effecting one complete rotation, said positions respectively successively corresponding in a forward step direction to the digits 1, 2, 3, 4, 5, 6, 7, 8, 9, and 0; an output add pulse terminal; a source of electrical energy independent of said input add and subtract pulses, and means for superimposing electrical energy from said source on said input add and subtract pulses in aid of said pulses; an output subtract pulse terminal; add pulse means for providing a single output add pulse at said output add pulse terminal each time said wheel is stepped forward from a position corresponding to the digit 9 to a position corresponding to the digit 0; a subtract pulse means for providing a single output subtract pulse at said output subtract pulse terminal each time said wheel is stepped backward from a position corresponding to the digit 0 to a position corresponding to the digit 9; said add pulse means and said subtract pulse means respectively comprising printed conducting arcuate portions on said wheel of circumferential extent less than 36 degrees; and first and second pairs of contacts stationarily positioned adjacent said wheel to be bridged respectively by said conducting portions only when said wheel is between its positions corresponding to said digits 9 and 0 respectively, said first pair of contacts being connected respectively to said input and output add pulse terminals, and said second pair of contacts being connected respectively to said input and output subtract pulse terminals; said wheel including a ratchet wheel member secured thereto, said first means and second means including first and second pawl arms positioned at subtsantially diametrically opposite sides of said ratchet wheel and engaging said ratchet wheel to rotate said wheel in a forward and backward step in response to movement of said first and second pawl arms respectively; first and second electromagnet means respectively connected to said input add pulse terminal and input subtract pulse terminal to move said first and second pawls respectively in response to energization by an input add pulse and an input subtract pulse; said first and second electromagnet means each including self-energizing switch means; a normally closed de-energizing switch connected between said source of electrical energy independent of said input pulses and said self-energizing switch means, said self-energizing switch means closing in response to energization of the electromagnet means associated therewith to maintain said electromagnet means energized from said source, said de-energizing switch being positioned for actuation in response to terminal movement of said pawls in their extreme positions to open and thereby de-energize said electromagnet means, whereby the actuation of said pawls in response to said pulses is independent of the width of said pulses; and the counter units of the counter each being identical and respectively connected in series with each other so that the input add pulse terminal and input subtract pulse terminal of any one additional counter are connected respectively to the output add pulse terminal and output subtract pulse terminal of the immediately preceding counter, whereby a number having a number of digits corresponding to the number of counters may be indicated.

2. The subject matter of claim 1, including a printed conductor portion on said wheel circumferentially extending more than 324 degrees and less than 360 degrees to leave a non-conducting arcuate portion thereon; and a pair of reset contacts stationarily positioned adjacent to said wheel to be bridged by said printed conductor portion when said wheel is in a position corresponding to any of said digits other than 0 and to be electrically disconnected by said non-conducting arcuate portion when said wheel is in a position corresponding to said 0 digit; a reset switch connected between said source of electrical energy and one of said reset contacts; and a normally closed recycling switch connected between the other of said reset contacts and one of said electromagnet means so that said electromagnet means is energized when said reset switch is closed, said recycling switch being positioned for actuation in response to initial movement of that pawl associated with said one electromagnet means to open so that de-energization of said electromagnetic means is solely controlled by said self-energizing switch means associated therewith and said normally closed de-energizing switch.

3. The subject matter of claim 1, including a shut-off switch in series between said source of electrical energy and only that normally closed de-energizing switch associated with said first mentioned counter so that when open said counter is controlled only by the pulse width of the initial pulses received therein, said additional counters being controlled by their associated self-energizing switch means and de-energizing switches; and means connecting said shut-off switch to said re-set switch for simultaneous opening and closing together.

4. A counter for adding input add pulses and subtracting input subtract pulses to indicate at any instant a number equal to the total number of add pulses received less the total number of subtract pulses received, including, in combination; an input add pulse terminal; an input subtract pulse terminal; a wheel; first means for rotating said wheel in discrete forward steps in response to reception at said input add pulse terminal of each of said add pulses respectively; second means for rotating said wheel in discrete backward steps in response to reception at said input subtract pulse terminal of each of said subtract pulses respectively, whereby said wheel is capable of a predetermined number of different discrete positions angularly separated in effecting one complete rotation, said positions respectively successively corresponding in a forward step direction to consecutive digits, first and second electromagnet means respectively connected to said input add pulse terminal and input subtract pulse terminal to move said first and second means for rotating said wheel respectively in response to energization by an input add pulse and an input subtract pulse, said first and second electromagnet means each including self-energizing switch means, a source of electrical energy independent of said pulses; and a normally closed de-energizing switch connected between said source and said self-energizing switch means, said self-energizing switch means closing in response to energization of the electromagnet means associated therewith to maintain said electromagnet means energized from said source, said de-energizing switch being positioned for actuation in response to terminal movement of said first and second means for rotating said wheel to open and thereby de-energize said electromagnet means, whereby the actuation of said first and second means for rotating said wheel in response to said pulses is independent of the width of said pulses.

5. The subject matter of claim 4 including, an output add pulse terminal; an output subtract pulse terminal; add pulse means for providing a single output add pulse at said output terminal each time said wheel is stepped forward from a position corresponding to the last digit to a position corresponding to the first digit; and a subtract pulse means for providing a single output subtract pulse at said output subtract pulse terminal each time said wheel is stepped backward from a position corresponding to the first digit to a position corresponding to the last digit.

6. The subject matter of claim 5 including additional counters each identical to the counter defined in claim 5 and respectively connected in series with each other so that the input add pulse terminal and input subtract pulse terminal of any one additional counter are connected respectively to the output add pulse terminal and output subtract pulse terminal of the immediately preceding counter, whereby a number having a number of digits corresponding to the number of counters may be indicated.

7. The subject matter of claim 6 in which said add pulse means and said subtract pulse means respectively comprise printed conducting arcuate portions on said wheel of circumferential extent less than 360 degrees divided by the number of predetermined discrete positions; and first and second pairs of contacts stationarily positioned adjacent said wheel to be bridged respectively by said conducting portions only when said wheel is between its positions corresponding to the last digit and the first digit respectively, said first pair of contacts being connected respectively to said input and output add pulse terminals and said second pair of contacts being connected respectively to said input and output subtract pulse terminals.

8. The subject matter of claim 7, in which said wheel includes a ratchet wheel member secured thereto, said first means and second means including first and second pawl arms positioned at substantially diametrically opposite sides of said ratchet wheel and engaging said ratchet wheel to rotate said wheel in a forward and backward step in response to movement of said first and second pawl arms respectively.

9. The subject matter of claim 8, including a printed conductor portion on said wheel circumferentially extending less than 360 degrees leaving a non-conducting arcuate portion thereon of less than 360 degrees divided by the number of predetermined discrete positions; and a pair of reset contacts stationarily positioned adjacent to said wheel to be bridged by said printed conductor portion when said wheel is in a position corresponding to any of said digits other than the first digit and to be electrically disconnected by said non-conducting arcuate portion when said wheel is in a position corresponding to said first digit; a reset switch connected between said source of electrical energy and one of said reset contacts; and a normally closed recycling switch connected between the other of said reset contacts and one of said electromagnet means so that said electromagnet means is energized when said reset switch is closed, said recycling switch being positioned for actuation in response to initial movement of that pawl associated with said one electromagnet means to open so that de-energization of said electromagnet means is solely controlled by said self-energizing switch means associated therewith and said normally closed de-energizing switch.

10. The subject matter of claim 4, in which said wheel includes a plurality of uniformly spaced projections on its periphery defining indexing channels; and first and second pivoted indexing arms biased into said channels and responsive to energization of said first and second electromagnet means respectively to disengage their corresponding channels, whereby said wheel is indexed in any of its different discrete positions.

11. The subject matter of claim 6, including a shutoff switch in series between said source of electrical energy and only that normally closed de-energizing switch associated with said first mentioned counter so that when open said counter is controlled only by the pulse width of the initial pulses received therein, said additional counters being controlled by their associated self-energizing switch means and de-energizing switches; and means connecting said shutoff switch to reset switch for simultaneous opening and closing together.

References Cited in the file of this patent

UNITED STATES PATENTS

| | | |
|---|---|---|
| 2,295,968 | Poole | Sept. 15, 1942 |
| 2,375,413 | Guenther | May 8, 1945 |
| 2,377,583 | Smith | June 5, 1945 |
| 2,586,173 | Nelsen | Feb. 19, 1952 |
| 2,600,144 | Watson | June 10, 1952 |
| 2,784,874 | Harper | Mar. 12, 1957 |
| 2,904,250 | Allebach | Sept. 15, 1959 |
| 2,930,529 | Laboissiere | Mar. 29, 1960 |
| 2,973,145 | Daniels et al. | Feb. 28, 1961 |
| 3,023,957 | Goodman | Mar. 6, 1962 |
| 3,047,225 | Grafstein et al. | July 31, 1962 |

FOREIGN PATENTS

| | | |
|---|---|---|
| 789,506 | Great Britain | Jan. 22, 1958 |